(12) United States Patent  
Wu

(10) Patent No.: US 7,447,822 B2  
(45) Date of Patent: Nov. 4, 2008

(54) HOT-PLUG CONTROL SYSTEM AND METHOD

(75) Inventor: Ming-Chen Wu, Taipei (TW)

(73) Assignee: Inventec Corporation, Taipei (TW)

( * ) Notice: Subject to any disclaimer, the term of this patent is extended or adjusted under 35 U.S.C. 154(b) by 101 days.

(21) Appl. No.: 11/301,697

(22) Filed: Dec. 12, 2005

(65) Prior Publication Data

US 2007/0136504 A1 Jun. 14, 2007

(51) Int. Cl.
*G06F 13/00* (2006.01)

(52) U.S. Cl. ........................... 710/302; 710/104

(58) Field of Classification Search ............ 710/104, 710/301, 302
See application file for complete search history.

(56) References Cited

U.S. PATENT DOCUMENTS

| | | | | |
|---|---|---|---|---|
| 2005/0246460 A1* | 11/2005 | Stufflebeam, Jr. | ............ | 710/104 |
| 2006/0047984 A1* | 3/2006 | Ho et al. | ............ | 713/300 |
| 2006/0085585 A1* | 4/2006 | Wu et al. | ............ | 710/306 |
| 2006/0168377 A1* | 7/2006 | Vasudevan et al. | ............ | 710/104 |
| 2007/0005863 A1* | 1/2007 | Chang et al. | ............ | 710/302 |

OTHER PUBLICATIONS

Budruk, Ravi; Anderson, Don; and Shanley, Tom; PCI System Architecture; MindShare, Inc.; Chapter 17: Hot Plug; 2004.*
PCI Express Base Specification, Revision 1.1; PCI-SIG; Mar. 28, 2005; pp. 30-35 and 319-330.*

* cited by examiner

*Primary Examiner*—Glenn A Auve
(74) *Attorney, Agent, or Firm*—Jianq Chyun IP Office

(57) ABSTRACT

A hot-plug control system and method is applied to a computer device, wherein the computer device is provided with a PCI-E (Peripheral Component Interconnect Express) bus, at least one PCI-E slot having a power switch and an indicator light, a power control unit and a driver. The hot-plug control system at least includes a signal control module for generating an interrupt signal; a detection module for detecting the status of the PCI-E slot and the power switch corresponding to the PCI-E slot in response to the interrupt signal; a control module for allowing power to be provided to the PCI-E slot and the indicator light corresponding to the PCI-E slot to be illuminated when the detection module detects that a new expansion card has been inserted in the PCI-E slot and the corresponding power switch has been actuated; and a drive module for loading the driver to drive the inserted expansion card. According to the present invention, the PCI-E hot-plug function could be achieved in different kinds of computer devices.

16 Claims, 3 Drawing Sheets

HOT-PLUG CONTROL SYSTEM AND METHOD

BACKGROUND OF THE INVENTION

1. Field of the Invention

The present invention relates to a hot-plug technology, and more particularly, a hot-plug control system and method which could be applied to different kinds of computer devices to implement a PCI-E hot-plug function.

2. Description of Related Art

Modern computer devices usually interface peripheral devices to upgrade or update functions or add new functions. To drive a peripheral device, computer devices often need to be restarted and current operations need to be stopped, thereby resulting in complication and inconvenience and even resulting in data loss and service interruption of servers that require time continuity and high reliability.

Accordingly, a PCI (Peripheral Component Interconnection) technology providing hot-plug function is proposed, which has become a universal bus standard of computer devices. The PCI technology is an interconnection mechanism specially designed for highly integrated peripheral devices, expansion boards and processor/memory systems, which could connect various kinds of expansion cards, hard disks or optical disc drives with a computer system and implement bidirectional communications between those devices, system memory and processor. By using the PCI technology, PCI devices could be upgraded, updated or added without the need of shutting down or pausing computer devices, thereby greatly reducing planned or unplanned downtime and improving the performance of computer devices.

However, with further development and application expansion of the computer technology, the PCI bandwidth gradually becomes a bottleneck. The PCI technology could maximally provide a theoretical bandwidth of 1.056 Gbps. On the other hand, a network card requires a bandwidth of 1 Gbps, that is, 95% bandwidth of the PCI bus is occupied by the network card. This leaves little room for any other peripheral devices to use. In many circumstances, only one sound card is being used on the PCI bus, if other bandwidth-demanding peripheral devices are added, a part of the bandwidth used by the network card will be allocated to the devices. Consequently, the network speed will be influenced to some degree.

Thus, a PCI-Express (PCI-E) hot-plug technology is proposed by Intel Inc. to replace the PCI hot-plug technology. The main frequency of computer devices using PCI-Express hot-plug technology could reach 2.5 GHz and the data transfer rate is also increased a lot.

FIG. 1 is a block diagram of a PCI-E hot-plug system proposed by Intel Inc. As shown in FIG. 1, a computer device 4 has a CPU (Central Process Unit) 40, a MCH (Memory Controller Hub) chip 42 and an ICH (Input/Output Controller Hub) chip 44, wherein the MCH chip 42 is provided with a hot-plug controller 420. A PCI-E hot-plug construction 5 includes a plurality of insertion slots 50, a PCI-E bus 52 electrically connecting the MCH chip 42 with the slots 50, a power control unit 54 and an interrupt signal generation module 56 for generating interrupt signals, wherein the interrupt signal generation module 56 could be a PCA9555. Each of the slots 50 includes a power button (not shown) and an indicator light 502 to indicate the work status of the slots 50. The PCI-E hot-plug function is implemented as follows: first, an interrupt signal is generated by the interrupt signal generation module 56; then, the interrupt signal is sent to the hot-plug controller 420; subsequently, the hot-plug controller 420 detects the hot-plug operation on the slots 50, according to which the power control unit 54 controls the power of the slot 50; finally, the driver is loaded to implement the PCI-E hot-plug function.

Compared with the PCI technology of the prior art, the PCI-E hot-plug technology is simpler, faster and has a much wider bandwidth.

However, the PCI-E hot-plug technology can only be applied to a computer device that is provided with a specialized PCI-E hot-plug control chip produced by Intel Inc. while it is impossible for other computer devices such as those produced by the AMD Inc. to use the PCI-E hot-plug technology, thereby limiting the application of the PCI-E hot-plug technology.

SUMMARY OF THE INVENTION

According to the above shortcomings, a primary objective of the present invention is to provide a hot-plug control system and method which employs software to simulate the interconnection procedures when peripheral devices using the PCI-E hot-plug technology are interconnected to computer devices such that the PCI-E hot-plug technology could be applied to computer devices having various different hardware specifications, thereby enhancing the generality of the PCI-E hot-plug technology.

Another objective of the present invention is to provide a hot-plug control system and method which could simplify the design of internal circuits of computer devices, thereby reducing production cost.

To achieve the above and other objectives, a hot-plug control system and method is proposed. The hot-plug control system of the present invention could be applied to a computer device, wherein the computer device is provided with a PCI-E (Peripheral Component Interconnect Express) bus, at least one PCI-E slot having a power switch and an indicator light, a power control unit and a driver. The hot-plug control system includes a signal control module for generating an interrupt signal; a detection module for detecting the status of the PCI-E slot and its corresponding power switch in response to the interrupt signal; a control module for allowing power to be provided the PCI-E slot and the indicator light corresponding to the PCI-E slot to be illuminated when the detection module detects that a new expansion card has been inserted in the PCI-E slot and the corresponding power switch has been actuated; and a drive module for loading the driver for driving the newly inserted expansion card.

Therein, when the detection module has detected that there is no new expansion card inserted in the PCI-E slot and the power switch of the PCI-E slot with the originally inserted expansion card has been actuated, the control module further causes the drive module to remove the driver, shut off the power and turn off the indicator light of the PCI-E slot in order to remove the inserted expansion card.

The hot-plug control method of the present invention could be applied to a computer device having a hot-plug control system, wherein the computer device is provided with a PCI-E bus, at least one PCI-E slot having a power switch and an indicator light, a power control unit and a driver. The hot-plug control method includes: generating an interrupt signal after the computer device is initialized; providing power to the PCI-E slot and illuminating the indicator light corresponding to the PCI-E slot when detecting that a new expansion card has been disposed on the PCI-E slot and the corresponding power switch has been actuated; and loading the driver for driving the new expansion card.

The hot-plug control method further includes removing the driver, shutting off the power and turning off the corresponding indicator light of the PCI-E slot when detecting that there the power switch of the PCI-E slot with the expansion card inserted therein has been actuated so that the expansion card could be removed.

Thus, the hot-plug control system and method of the present invention implements a universal PCI-E hot-plug function that could be applied to different kinds of computer devices by combining peripheral devices using the PCI-E hot-plug technology with a computer device with general construction. Accordingly, there is no need to design a specialized PCI-E hot-plug control chip for a specific computer device, thereby simplifying circuit design and reducing production cost.

DETAILED DESCRIPTION OF PREFERRED EMBODIMENTS

Hereunder, embodiments of the present invention will be described in full detail with reference to the accompanying drawings.

Figure 1:
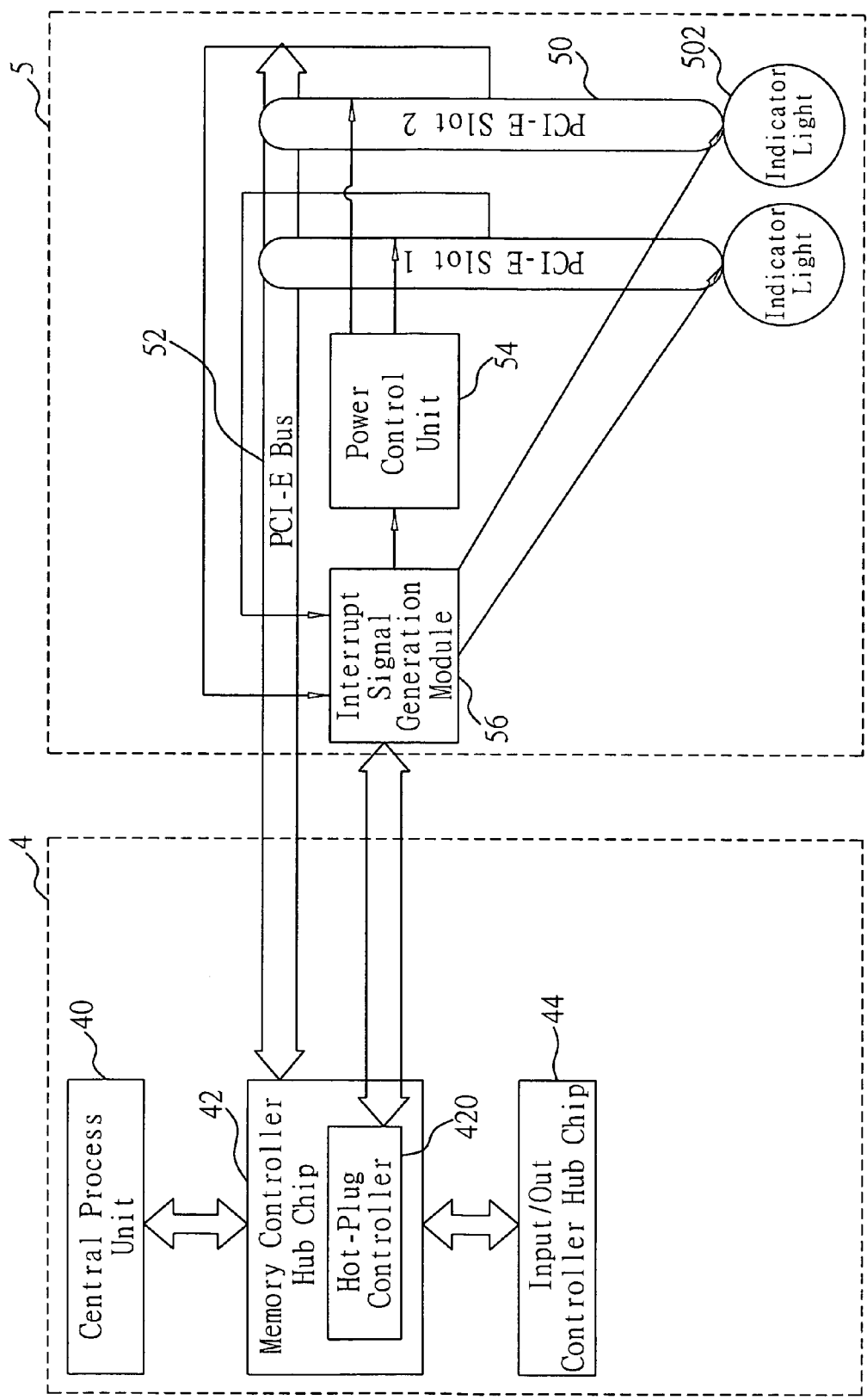
FIG. 1 is a block diagram showing a system construction of a PCI-E hot-plug technology of the prior art.
Figure 2:
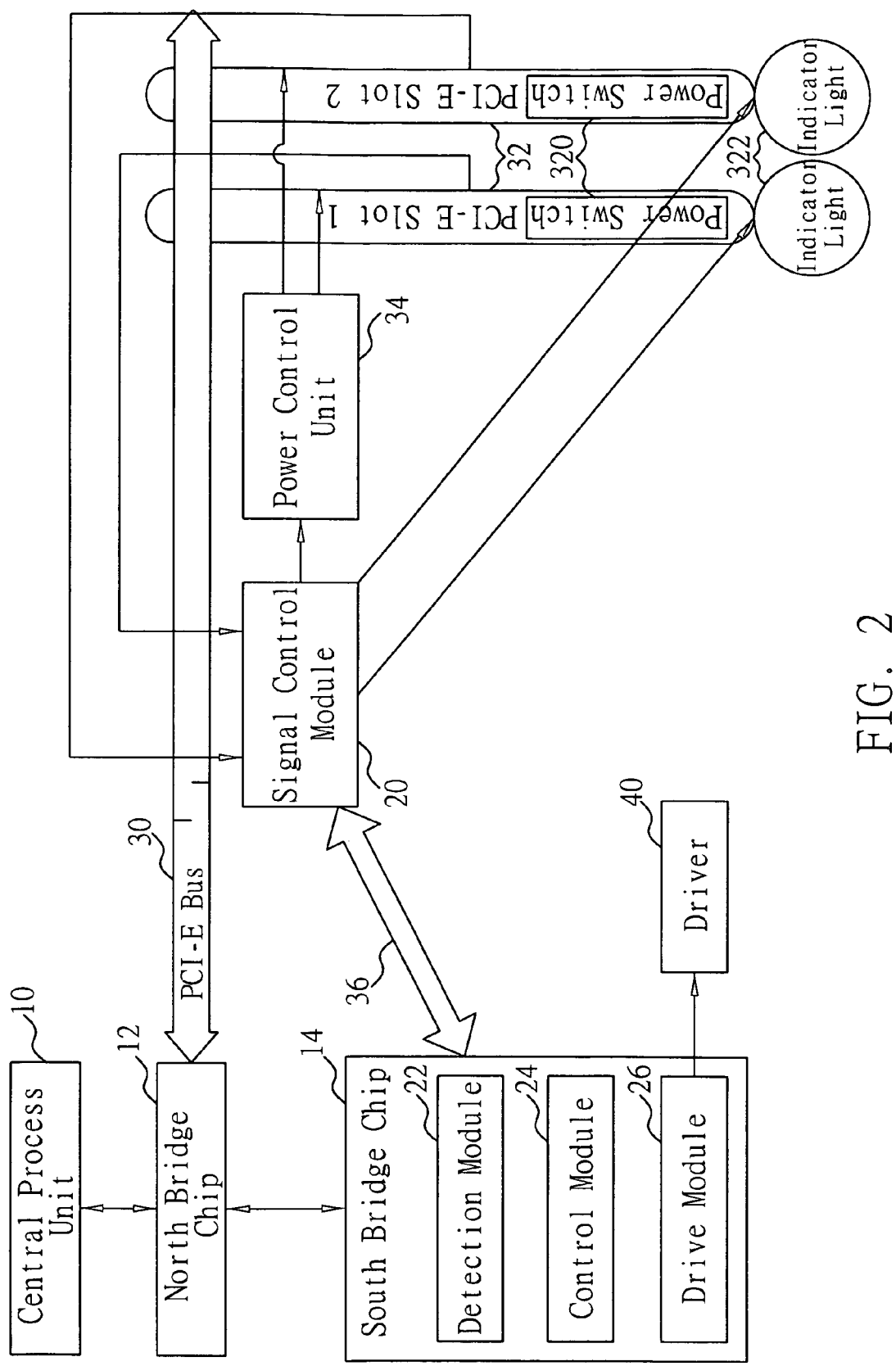
FIG. 2 is a block diagram of the hot-plug control system of the present invention.

As shown in FIG. 2, the hot-plug control system of the present invention comprises a signal control module 20, a detection module 22, a control module 24 and a drive module 26. The hot-plug control system is applied in a computer device having traditional components such as a CPU (Central Process Unit) 10, a NB (North Bridge) chip 12 and a SB (South Bridge) chip 14. Meanwhile, the computer device is further provided with a PCI-E (Peripheral Component Interconnect Express) bus 30, at least one PCI-E slot 32 having a power switch 320 and an indicator light 322, a power control unit 34 and a driver 40. The power switch 320 could be a button. The indicator light 322 could be a LED light, which is used to indicate work status of the PCI-E slot 32.

The signal control module 20 is used to generate an interrupt signal. In the present embodiment, the signal control module 20 is a PCA9555 chip, which functions as a simulated PCI device according to hot-plug status of the PCI-E slot 32 to generate an interrupt signal, the generated interrupt signal being further sent to the detection module 22 through a SMBus (System Management Bus) 36.

After receiving the interrupt signal of the signal control module 20, the detection module 22 detects status of the PCI-E slot 32 and the corresponding power switch 320, more specifically, detects whether a new expansion card has been inserted into the PCI-E slot 32 and whether the corresponding power switch 320 has been actuated. The expansion card could be a floppy disk drive, a hard disk drive, a CD-ROM drive, a CD-R/W drive, a DVD drive, a sound card or a network card.

The control module 24 is used to control a PCI-E slot 32 according to the detection result of the detection module 22. If the detection module 22 has detected that a new expansion card has been inserted into the PCI-E slot 32 and the corresponding power switch 320 has been actuated, the control module 24 drives the power control unit 34 to provide power to the PCI-E slot 32 and causes the signal control module 20 to illuminate the corresponding indicator light 322, thereby the drive module 26 loading the driver 40 to drive the new expansion card. On the other hand, if the detection module 22 has detected that there is no newly inserted expansion card in the PCI-E slot 32 and the power switch 320 of the PCI-E slot 32 with the originally inserted expansion card has been actuated, the control module 24 causes the drive module 26 to remove the driver 40 and causes the power control unit 34 and the signal control module 20 to respectively turn off the power and the indicator light 322 of the PCI-E slot 32, thereby removing the expansion card.

Figure 3:
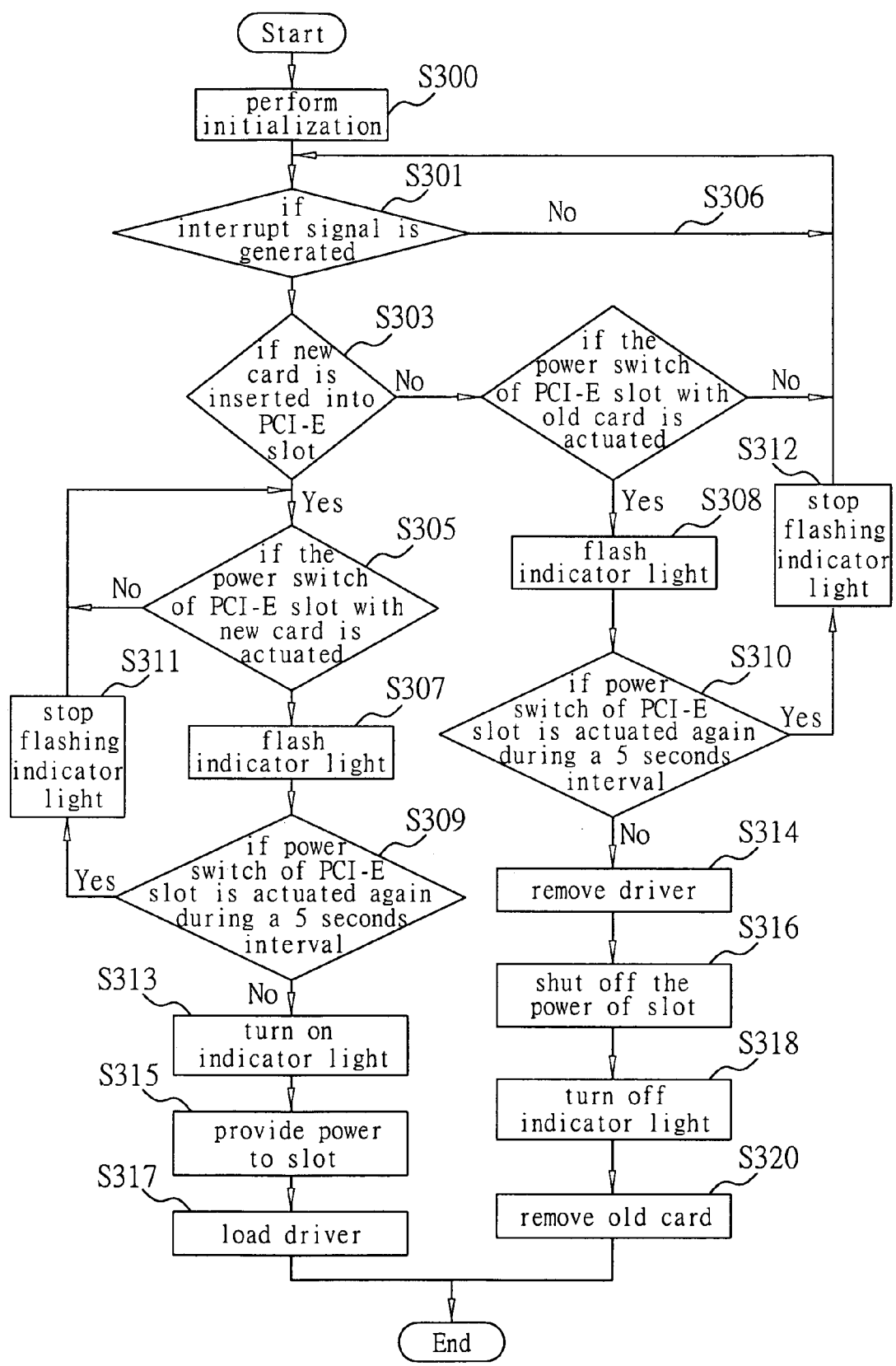
FIG. 3 is a process flow diagram of the hot-plug control method of the present invention.

FIG. 3 shows a process flow of a hot-plug control method according to the present invention. The hot-plug control method is illustrated in conjunction with the above hot-plug control system of the present invention. When a computer device is started up, an initialization process is performed to enable the hot-plug function of the computer device in step S300. Then, process flow moves to step S301.

In step S301, the hot-plug control system judges whether the signal control module 20 has generated an interrupt signal, if so, process flow moves to step S303, otherwise, step S301 is performed again.

In step S303, the detection module 22 detects whether a new expansion card has been inserted into the PCI-E slot 32 upon receiving the interrupt signal of the signal control module 20, wherein the expansion card could be a floppy disk drive, a hard disk drive, a CD-ROM drive, a CD-R/W drive, a DVD drive, a sound card or a network card. If a new expansion card has been detected, process flow moves to step S305, otherwise, process flow moves to step S306.

In step S305, the detection module 22 further detects and judges whether the power switch 320 of the PCI-E slot 32 having the inserted expansion card has been actuated, if so, process flow moves to step S307, otherwise, step S305 is performed again.

In step S307, the control module 24 causes the signal control module 20 to flash the indicator light 322 of the PCI-E slot 32. In the present embodiment, the indicator light 322 is a LED light. Then, process flow moves to step S309.

To prevent occurrence of mishandle, in step S309, the detection module 22 judges whether the power switch 320 of the PCI-E slot 32 has been actuated again during a time interval such as 5 seconds, if so, process flow moves to S311, otherwise, process flow moves to S313.

In step S311, the control module 24 causes the signal control module 20 to stop flashing the indicator light 322 of the PCI-E slot 32 having the inserted expansion card. Then, process flow returns to step S305.

In step S313, the signal control module 20 controls the indicator light 322 of the PCI-E slot 32 such that the indicator light 322 illuminates continuously. Then, process flow moves to step S315.

In step S315, the power switch device controlled by the control module 24 provides power to the PCI-E slot 32 having the inserted expansion card. Then, process flow moves to step S317.

In step S317, the drive module 26 loads the driver of the inserted expansion card to drive the expansion card, thereby implementing the hot-plug-in function related to the PCI-E hot-plug technique.

The hot-plug-out function is described as follows. Again referring to FIG. 3, in step S306, the detection module 22 further detects the power switch 320 of the PCI-E slot 32 having the originally-inserted expansion card has been actuated upon detecting there is no new expansion card inserted in the PCI-E slot 32, if so, process flow moves to step S308, otherwise, step S301 is performed again.

In step S308, the signal control module 20 controlled by the control module 24 flashes the indicator light 322 of the PCI-E slot 32. Then, process flow moves to step S310.

To prevent occurrence of mishandle, in step S310, the detection module 22 judges whether the power switch 320 of the PCI-E slot 32 has been actuated again during a time interval such as 5 seconds, if so, process flow moves to S312, otherwise, process flow moves to S314.

In step S312, the signal control module 20 controlled by the control module 24 stops flashing the indicator light 322 and step S301 is performed again.

In step S314, the drive module 26 removes the driver of the inserted expansion card and process flow moves to step S316.

In step S316, the power control unit 34 shuts off the power of the slot 32 having the expansion card and process flow moves to step S318.

In step S318, the signal control module 20 controlled by the control module 24 turns off the indicator light 322 and process flow moves to step S320.

In step S320, the expansion card is removed, thereby implementing the hot-plug-out function.

As a result, the hot-plug control system and method of the present invention implements a universal PCI-E hot-plug function that could be used in different kinds of computer devices by combining PCI-E technology with the general infrastructure of the computer devices. Accordingly, there is no need to design a specialized PCI-E hot-plug control chip for a specific computer device, thereby simplifying circuit design and reducing production cost.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A hot-plug control system applied to a computer device, wherein the computer device is provided with a PCI-E (Peripheral Component Interconnect Express) bus, at least one PCI-E slot having a power switch and an indicator light, a power control unit and a driver, the hot-plug control system comprising:
a signal control module for generating an interrupt signal;
a NB (North Bridge) chip electrically connected to the PCI-E slot: and
a SB (South Bridge) chip electrically connected to the NB chip and the signal control module, the signal control module sending the interrupt signal to the SB chip, the SB chip comprising:
a detection module for detecting the status of the PCI-E slot and its corresponding power switch in response to the interrupt signal;
a control module for providing power to the PCI-E slot and then illuminating the indicator light corresponding to the PCI-E slot when the detection module detects that an expansion card is newly inserted in the PCI-E slot and the corresponding power switch has been actuated, and for stopping providing power to the PCI-E slot and the indicator light corresponding to the PCI-E slot when the detection module detects that the power switch of the PCI-E slot into which another expansion card is originally inserted and has a driver installed is actuated; and
a drive module for loading a driver of the expansion card inserted for driving the expansion card inserted in the PCI-E slot when the detection module provides power to the PCI-E slot when detecting that the PCI-E slot is inserted with the expansion card and the power switch is actuated, and for removing the driver of the another expansion card when the detection module detects that the power switch of the PCI-E slot into which the another expansion card is originally inserted is actuated,
wherein PCI-E hot-plug technology is applied to computer devices through the use of the SB chip, the detection module, the control module, and the drive module, without being limited to the computer devices having identical specifications.

2. The hot-plug control system of claim 1, wherein when the detection module detects that the power switch of the PCI-E slot with the expansion card inserted has been actuated again, the control module further controls the signal control module to flash the indicator light of the PCI-E slot, the detection module judges whether the power switch of the PCI-E slot has been actuated again during a time interval, and the drive module loads the driver of the expansion card if the power switch is not actuated during the time interval.

3. The hot-plug control system of claim 1, wherein the power switch is a button.

4. The hot-plug control system of claim 1, wherein the expansion card is one selected from the group consisting of a floppy disk drive, a hard disk drive, a CD-ROM drive, a CD-R/W drive, a DVD drive, a sound card and a network card.

5. The hot-plug control system of claim 1, wherein when the detection module detects that the power switch of the PCI-E slot in which the another expansion card is inserted has been actuated again, the control module further controls the signal control module to flash the indicator light of the PCI-E slot, the detection module judges whether the power switch of the PCI-E slot has been actuated again during a time interval, and the drive module removes the driver of the another expansion card if the power switch is not actuated during the time interval.

6. The hot-plug control system of claim 1, wherein the computer device further comprises a system management bus (SMBus), and the interrupt signal is sent by the SMBus to the SB chip for the detection module to detect a status of the PCI-E slot and the power switch corresponding to the PCI-E slot.

7. A hot-plug control method applied to a computer device having a hot-plug control system, wherein the computer device is provided with a PCI-E bus, an NB chip electrically connected to the PCI-E bus, an SB chip electrically connected to the NB chip and having embedded software, a signal control module, at least one PCI-E slot having a power switch and an indicator light, a power control unit and a driver, to load a driver of an expansion card newly inserted into the PCI-E slot, the hot-plug control method comprising:
after the PCI-E slot is inserted with the expansion card, generating an interrupt signal with the signal control module to enable the SB chip to execute the embedded software to provide power to the PCI-E slot and illuminating the indicator light corresponding to the PCI-E slot upon detecting that the PCI-E slot is inserted with the expansion card and the power switch corresponding to the PCI-E slot is actuated; and
loading the driver of the expansion card for driving the expansion card inserted into the PCI-E slot.

8. The hot-plug control method of claim 7 further includes when detecting that the power switch of the PCI-E slot with the expansion card has been actuated again, flashing the indicator light of the PCI-E slot, and enabling the embedded software of the SB chip to judge whether the power switch of the PCI-E slot has been actuated again during a time interval, and to execute the embedded software to load the driver of the expansion card if the power switch is not actuated during the time interval.

9. The hot-plug control method of claim 7, wherein the power switch is a button.

10. The hot-plug control method of claim 7, wherein the expansion card is one selected from the group consisting of a floppy disk drive, a hard disk drive, a CD-ROM drive, a CD-R/W drive, a DVD drive, a sound card and a network card.

11. The hot-plug control system of claim 7, wherein the computer device further comprises an SMBus, and the interrupt signal is sent by the SMBus to the SB chip for the SB chip to execute the embedded software to detect a status of the PCI-E slot and the power switch corresponding to the PCI-E slot.

12. A hot-plug control method applied to a computer device having a hot-plug control system, wherein the computer device is provided with a PCI-E bus, an NB chip electrically connected to the PCI-E bus, an SB chip electrically connected to the NB chip and having embedded software, a signal control module, at least one PCI-E slot having a power switch and an indicator light, a power control unit, an expansion card inserted into the PCI-E slot, and a driver, to remove a driver of an expansion card inserted into the PCI-E slot and having the driver installed, the hot-plug control method comprising:

actuating the power switch of the PCI-E slot in which the expansion card is inserted, and enabling the SB chip to execute the embedded software to remove the driver of the expansion card inserted into the PCI-E slot having the power switch actuated; and enabling the power control unit to power off the PCI-E slot in which the expansion card is inserted and has the driver installed, and power off the indicator light, so as to make information about the expansion card inserted into the PCI-E slot available to be plugged out the PCI-E slot.

13. The hot-plug control method of claim 12, further comprising, after the power switch is actuated, flashing the indicator light corresponding to the PCI-E slot, and enabling the embedded software of the SB chip to judge whether the power switch of the PCI-E slot has been actuated again during a time interval and to execute the embedded software to remove the drive of the expansion card if the power switch is not actuated during the time interval.

14. The hot-plug control method of claim 12, wherein the power switch is a button.

15. The hot-plug control method of claim 12, wherein the expansion card is one selected from the group consisting of: a floppy disk drive, a hard disk drive, a CD-ROM drive, a CD-RIW drive, a DVD drive, a sound card, and a network card.

16. The hot-plug control method of claim 12, wherein the computer device further comprises an SMBus, and the interrupt signal is sent by the SMBus to the SB chip for the SB chip to execute the embedded software to detect a status of the PCI-E slot and the power switch corresponding to the PCI-E slot.

* * * * *